(No Model.)
C. NECKER.
CLEVIS.
No. 245,390. Patented Aug. 9, 1881.
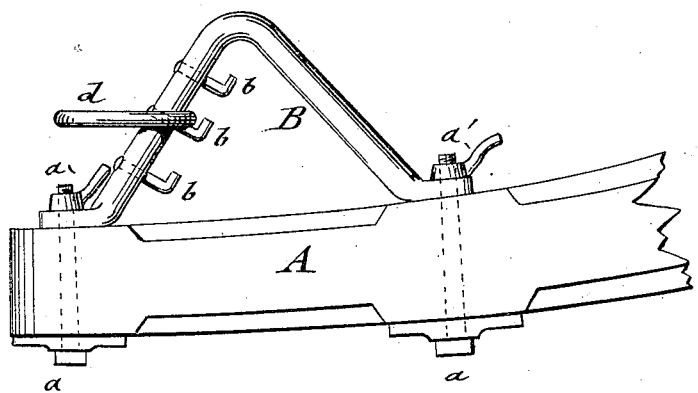
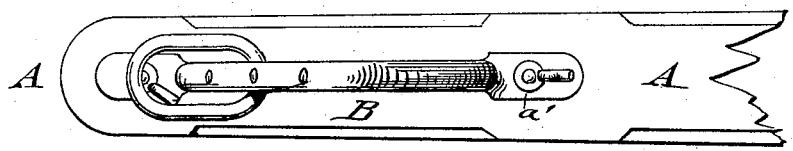
WITNESSES:
Carl Kern
Otto Risch
INVENTOR
Christoph Necker
BY Paul Goepel
ATTORNEY

United States Patent Office.

CHRISTOPH NECKER, OF WEEHAWKEN, NEW JERSEY.

CLEVIS.

SPECIFICATION forming part of Letters Patent No. 245,390, dated August 9, 1881.

Application filed May 9, 1881. (No model.)

*To all whom it may concern:*

Be it known that I, CHRISTOPH NECKER, of Weehawken, in the county of Hudson and State of New Jersey, have invented certain new and useful Improvements in Plow-Clevises, of which the following is a specification.

This invention relates to an improved clevis for plows, by which the whiffletree is set back and connected to the beam back of its end, so that a greater or less inclination, and consequently a greater or less depth of the share, is obtained, in a more advantageous manner than with the plow-clevises heretofore in use, which are attached to the outermost end of the beam; and the invention consists of a plow-clevis which is attached to the top part of the beam back of its front end, and which is made of angular shape, and provided at its inclined front part with inwardly-projecting hooks for the link of the whiffletree.

In the accompanying drawings, Figure 1 represents a side elevation of a plow-beam with my improved plow-clevis, and Fig. 2 is a top view of the same.

Similar letters of reference indicate corresponding parts.

Referring to the drawings, A represents a plow-beam, and D the clevis, which is attached by means of fastening-bolts $a$ and nuts $a'$ to the top part of the beam, back of the front end of the same, as shown clearly in Figs. 1 and 2. The clevis B is made of angular shape, the apex of the angle forming its highest point above the beam, while the ends of its sides are enlarged and perforated for the passage of the fastening-bolts. The inclined front part of the clevis B is provided with inwardly-projecting hooks or lugs $b$, into one of which the link $d$ of the whiffletree is placed in higher or lower position, as required.

The advantages obtained by this construction of plow-clevis are, first, that the whiffletree is brought back of the front end of the beam, and supported above the same, instead of in front of the beam; secondly, that the connection of the whiffletree with the clevis is above the line of draft; thirdly, that by setting the whiffletree higher or lower in the hooks of the clevis a more or less powerful action of the plowshare is obtained; and, lastly, that, owing to the connection of the whiffletree to a clevis back of the end of the beam, the plow can be turned around in a much smaller space, which is of importance to market-gardeners and others cultivating small pieces of ground, as thereby the plow can be used to greater advantage.

Having thus described my invention, I claim as new and desire to secure by Letters Patent—

In combination with a plow-beam, the angular clevis B, provided with inwardly-projecting hooks $b$ upon its front angle, and bolted to the top of the beam, substantially as shown and described.

In testimony that I claim the foregoing as my invention I have signed my name, in presence of two witnesses, this 28th day of April, 1881.

CHRISTOPH NECKER.

Witnesses:
PAUL GOEPEL,
CHAS. F. HOENIG.